Patented Sept. 20, 1927.

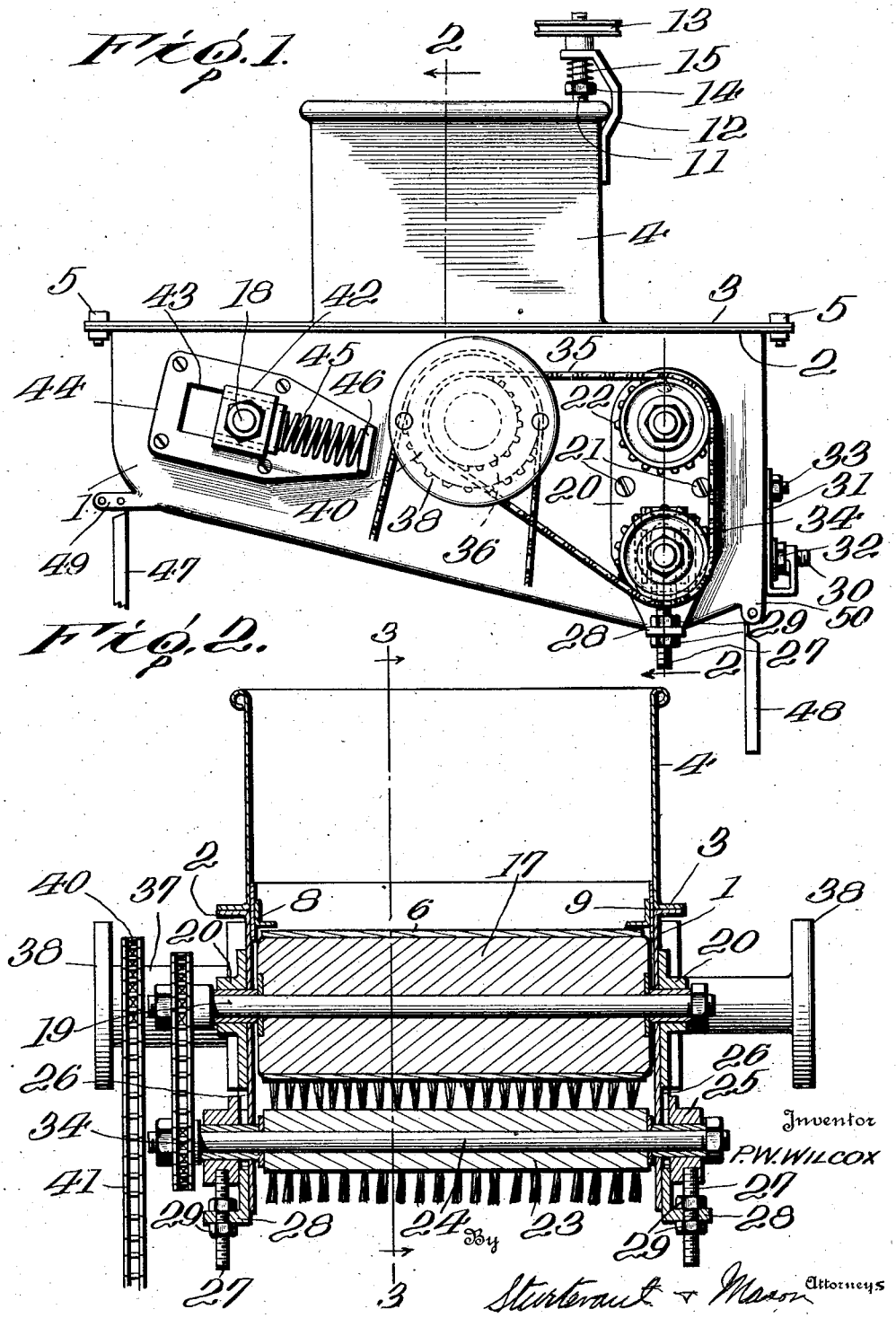

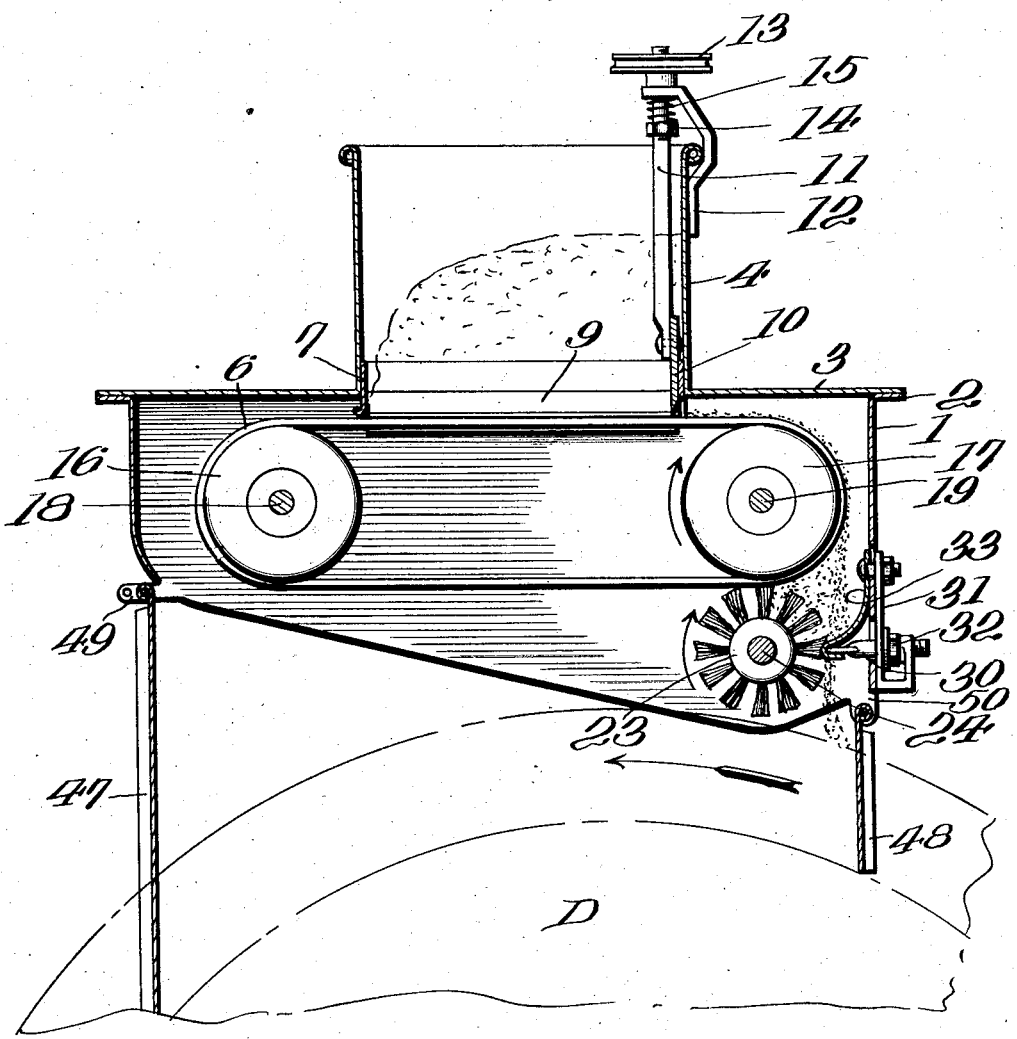

1,643,143

UNITED STATES PATENT OFFICE.

PHILIP W. WILCOX, OF ATLANTA, GEORGIA; KATHARINE RAWLING WILCOX EXECUTRIX OF SAID PHILIP W. WILCOX, DECEASED.

APPARATUS FOR DUSTING POWDERED SUBSTANCES ON SURFACES.

Application filed March 6, 1923. Serial No. 623,252.

This invention relates to a method and apparatus for depositing or dusting powdered or pulverulent substances upon desired surfaces. One adaptation of the broad invention consists in depositing powdered oil or flour upon the drums of bakers' molding or other machines, or upon baking pans and the like. Manifestly the invention is not limited to these specific examples of its applicability, but for the purpose of expressing the broad invention, and also for the purpose of pointing out its peculiar adaptation and utility for the baking art, it will be disclosed in connection with such art.

Up to the present time, considerable difficulty has been experienced in suitably applying flour or its powdered equivalent to the dough receiving surfaces of baking machinery, pans, utensils, and the like, and particularly to the rotating surfaces of the molding machine drums. The present practice consists in supporting over the molding machine drum, a hopper containing flour. This hopper is provided with a perforated bottom and an oscillatory brush which brushes across the perforations in the bottom, thereby not only agitating the flour within the hopper but also forcing it out through the perforations. Such an apparatus is defective, due first to the clogging of these perforations so that it is necessary to stop the machine every so often and clean the discharge perforations in the bottom of the hopper in order to make it function properly; secondly, because the oscillatory or intermittent motion applied to the brush does not produce a uniform feed, but rather, a wave-like blanket of flour on the drum beneath producing substantially bare spots and areas on which an excessive amount of greasing substance is deposited. If the dough or utensil be insufficiently provided with greasing substance, the bread sticks; on the other hand, excessive greasing produces black or burned spots on the baked dough, all of which must be avoided.

The present invention has for its object the uniform and thorough distribution of the powdered substance upon the entire surface to be treated.

Another aim of this invention resides in providing a method and apparatus for atomizing the powdered substance and its projection in the form of a spray or fog upon the surface to be treated, which is particularly effective in producing a uniform and thorough distribution of the powdered substance.

Still another object of this invention resides in providing a device which positively regulates the quantity of powdered substance which is deposited upon the desired surface.

These and other objects will be apparent from a perusal of the following specification when taken in connection with the accompanying drawings, wherein—

Figure 1 is a side elevation of the device;

Fig. 2 is a sectional view on the line 2—2 of Fig. 1, and

Fig. 3 is a section on the line 3—3 of Fig. 2.

In the present instance, the powdered greasing material is illustrated as being distributed upon the drum of a baker's molding machine. This drum is provided on its periphery with spaced flanges so that the cross section is substantially a square U-shape. The molded rolls of dough are carried on the periphery of the drum between these flanges.

Referring now to the details of the drawings which show one construction embodying the invention as applied to the drum, a lower casing 1 is provided at its upper portion with an outwardly extending flange 2 adapted to form a seat for a flange 3 of the upwardly extending hopper 4, the hopper 4 being secured to casing 1 by suitable bolts 5 passing through the flanges 3 and 2. Preferably the hopper 4 is open at its top and bottom, although it is obvious that a suitable cover may be used for the top of the hopper, if desired.

Means is provided for not only closing the open bottom of the hopper 4, but for also removing quantities of the powdered substance in the hopper. In the present form, this means consists of a traveling member in the form of an endless belt 6 of leather or sheet metal, which extends entirely across the bottom of the hopper as is shown clearly in Figures 2 and 3. If desired, the bottom of the hopper may be provided with a downwardly extending collar 7 to the sides of which longitudinally of the travel of the belt, are welded or otherwise fixed two channel-irons 8 and 9, the horizontal flange of which channel members provide inwardly projecting flanges which confine the discharge of the powdered substance from the hopper to the inner portions of the traveling belt 6. This provides a very simple means for preventing leakage of the powdered substance along the longitudinal edges of the traveling belt.

In order to regulate to a nicety the amount of powdered substance which is carried away by this belt 6, as the belt passes out through the side of the hopper, the latter is provided with an adjustable gate 10. This gate is preferably located at the point of emergence of the belt from the hopper and is adjustable toward and from the surface of the belt whereby the thickness of the layer of powdered substance in the belt may be regulated. A simple and convenient form of adjusting means comprises the rod 11 fixed by any suitable means to the gate 10. This rod 11 is mounted in a bracket 12 carried on the side of the hopper 4, and at its upper end is provided with an adjusting wheel 13, and an intermediate nut 14 between which and the under side of the bracket is coiled a spring 15 which operates to continually press the gate downwardly to the adjusted distance. By means of the nut 14 which threads on the upper portion of the rod 11, this distance may be controlled. The endless belt 6 is mounted on suitable rollers 16 and 17 carried by shafts 18 and 19, which shafts are in turn mounted in bearings 20 secured by the screws 21 to the casing 1. One end of the shaft 19 is provided with a sprocket gear 22 for driving this endless belt so that the powder is carried from the hopper in an endless stream.

Means is provided for atomizing this powdered substance and projecting it toward the substance to be treated in the form of a spray, mist or fog, so that the fine particles of substance will float in the air toward and will settle upon all portions of the desired surface. This action is particularly necessary because it is imperative that the sides of the pans or flanges of the molding machine drum be covered with the greasing substance to prevent sticking. In prior devices, this has not been possible. The desired embodiment of this means comprises a rotating brush 23, the preferably non-metallic bristles of which are co-extensive with the traveling belt 6. This brush is mounted upon a shaft 24 which in turn is mounted in a bearing 25 projecting through slots 26 in the bearing plate 20. Adjusting screws 27 are arranged at each end of the shaft 24 and are threaded at their upper ends into the bearings 25 and at their lower ends into a flange 28 at the base of the bearing plate 20. Suitable adjusting nuts 29 are provided for adjusting the shaft 24 the desired amount to and from the roller 17 about which the traveling belt passes. By means of this arrangement, the brush 23 rotates into contact with the traveling belt and preferably in the opposite direction thereto, so that the powder from the belt will either fall upon the bristles of the brush 23 or will be removed therefrom by brushing contact with the bristles of the brush as is illustrated in Fig. 3. This brush constitutes means for atomizing the powder and for projecting it toward the drum D in the form of a fog or mist. A convenient arrangement for effecting this consists in a rigid abutment 30 carried by the casing and arranged in the path of movement of the brush bristles so that as the latter rotate around, they will project or flick the powder thereon outwardly through the bottom of the casing toward the surface to be powdered or dusted. This abutment 30 is of any desired form, and is preferably carried by an adjustable bracket 31 held in desired adjustment by the nut 32. Preferably a shield 33 is provided for positively directing the powder against the brush bristles so that the powder cannot escape or pass the abutment as is clearly shown in Fig. 3. In addition, swinging doors 47 and 48 are provided which depend into the periphery of the drum D between the flanges shown in dotted lines. These doors are hinged preferably to the lower portion of the casing 1 by means of ears 49 and 50 so as to entirely close in that zone of the drum periphery beneath the rotating brush. The swinging doors permit the dough form to pass into and out of the compartment, and at the same time prevents the escape of and secures the localization of the fog or mist of powdered substance at the drum periphery. The outer ends of the brush shaft 24 are likewise provided with a sprocket gear 34 about which passes a sprocket chain 35. This chain also passes over the sprocket wheel 22 and over a third sprocket wheel 36 mounted on a shaft 37 carried by a support 38 at each end of the casing. The shaft 37 in addition, carries a larger sprocket 40 around which passes a drive chain 41 driven from any suitable source of power. The shaft 18 of the roller 16 is mounted in a bearing 42 slidable in ways 43 of plate 44 mounted on the side of casing 1. This bearing 42 is maintained in an outward position by means of a coiled spring 45 which is confined between bearing 42 and a flange 46 on the plate 44. By this means a suitable tension is given to the traveling belt.

In the operation of this device, the powdered oil, flour or other substance is fed into the hopper and the driving chain operated. The belt will then travel across the open bottom of the hopper 4 and will carry with it the coating of the powdered material which will be transferred to the brush 23 either by dropping thereon or by contacting with the brush. As the bristles rotate, they will come in contact with the rigid abutment 30 and will thereupon atomize and project the powdered oil toward the rotating drum of the molding machine in the form of a fog.

Careful observation and experiments have shown that the rotation of the brush bristles against the traveling belt 6 or against the metallic shield 33 imparts to these bristles a static charge of electricity which is transferred to the floaty particles of powdered dry oil so that when they are atomized and projected toward the rotating metallic drum D of the molding machine, there is a palpable tendency for these particles to be attracted to the drum and to adhere thereto so that as the drum rotates and is fed with dough forms the latter are effectively coated with the powdered substance.

It is obvious that instead of dusting the powder upon the rotating drum, the method and apparatus may be equally used for dusting bread pans or other desired objects.

By the use of this device, it will be apparent that there can be no clogging of the powdered substance in the hopper 4; that by means of the adjustable gate 10, just the correct amount of powdered substance will be fed to the rotating brush and that the substance so fed will be evenly and effectively distributed upon the surface to be dusted.

By means of the above described method of impacting or forcibly projecting particularly powdered oil against the surface to be dusted, a more effective oiling is obtained. This method is noticeably advantageous in the dusting of bread pans and the like. The projection of the oil particles produces a more lasting effect than is the case when the same is applied by merely dropping it on with the former machines. With the new process the powder effectively adheres to spots to which it will not stick when using former apparatus. Moreover, the distribution is much more uniform.

It is obvious that minor changes in the details of construction and the arrangement of the parts may be made without departing from the spirit of the invention as set forth in the appended claim.

Having thus described the invention, what I claim as new and desire to secure by Letters Patent, is—

A device of the class described comprising a hopper having a discharge outlet, a traveling endless belt disposed across said outlet for normally closing the outlet, means for moving said endless belt whereby a layer of the material in the hopper is carried from the hopper by said belt, means on said hopper and spaced from said belt for determining the thickness of the layer on said belt, a rotatable brush associated with said endless belt and disposed so as to remove the layer of material from said belt, and means for causing the bristles of the brush to flick the material taken from the belt against a desired surface beneath said brush, said means for causing the bristles to flick the material including an adjustable bracket lying in the path of movement of said bristles.

In testimony whereof, I affix my signature.

PHILIP W. WILCOX.